W. H. SEAVER.
TOBACCO STRIPPER.
APPLICATION FILED FEB. 21, 1918.

1,311,183.

Patented July 29, 1919.
2 SHEETS—SHEET 2.

Inventor
William H. Seaver
by
Harry P. Williams
Attorney

UNITED STATES PATENT OFFICE.

WILLIAM H. SEAVER, OF AGAWAM, MASSACHUSETTS, ASSIGNOR TO EDWIN KRAUSE, OF SPRINGFIELD, MASSACHUSETTS.

TOBACCO-STRIPPER.

1,311,183.  Specification of Letters Patent.  Patented July 29, 1919.

Application filed February 21, 1918. Serial No. 218,448.

*To all whom it may concern:*

Be it known that I, WILLIAM H. SEAVER, a citizen of the United States, residing at Agawam, in the county of Hampden and State of Massachusetts, have invented a new and useful Improvement in Tobacco-Strippers, of which the following is a specification.

This invention relates to a machine which is designed to strip leaves of tobacco from the stalks on which they grew.

The object of the invention is to provide a simple and reliable machine which, when the stalks with the leaves thereon are thrust into it, will carry the stalks in one direction and the leaves in another direction and thus tear the leaves from the stalks and deliver the stalks in condition for use as fertilizer, and the leaves gathered together in condition to be easily removed for packing.

Figure 1:
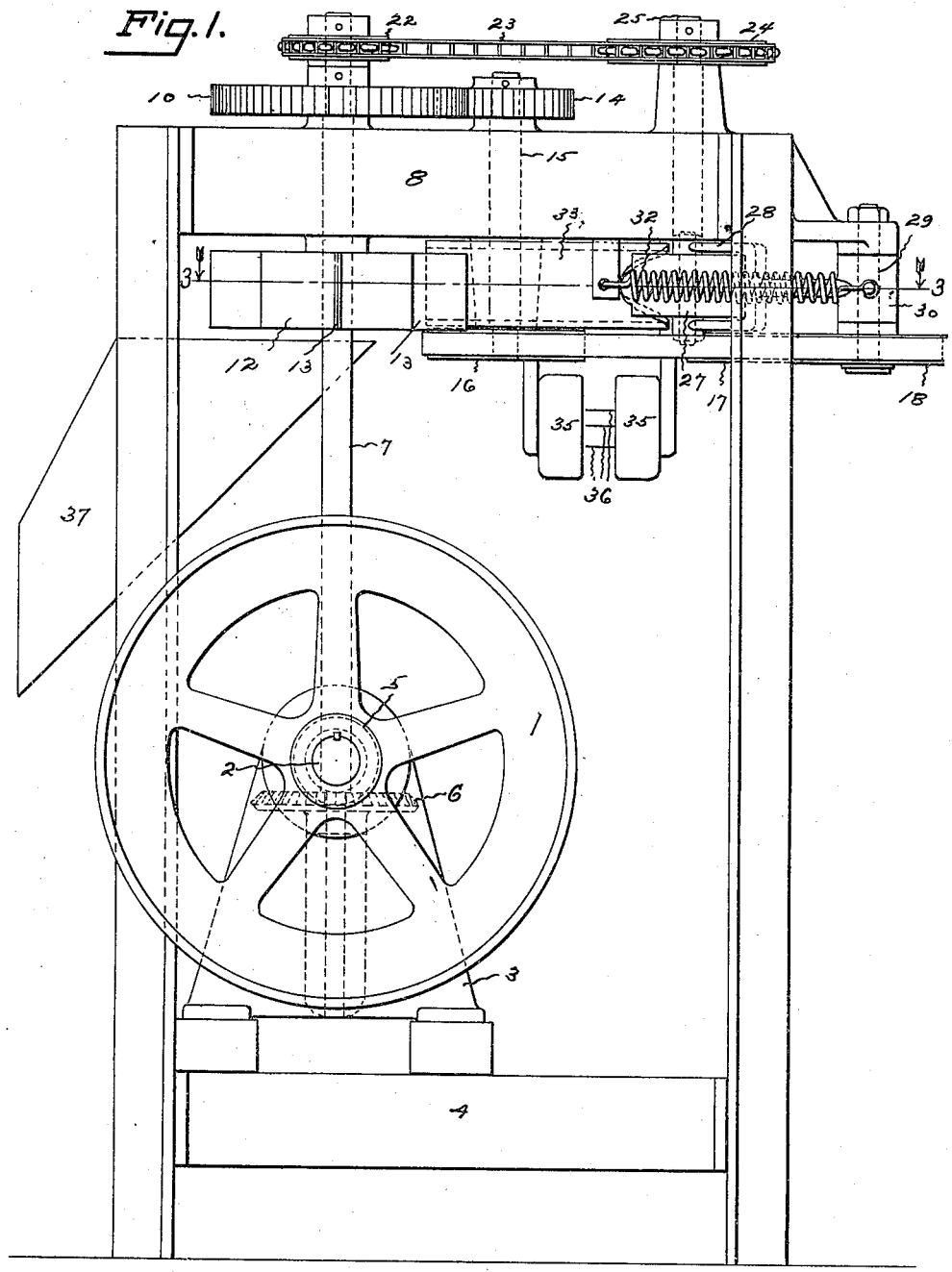
Figure 2:
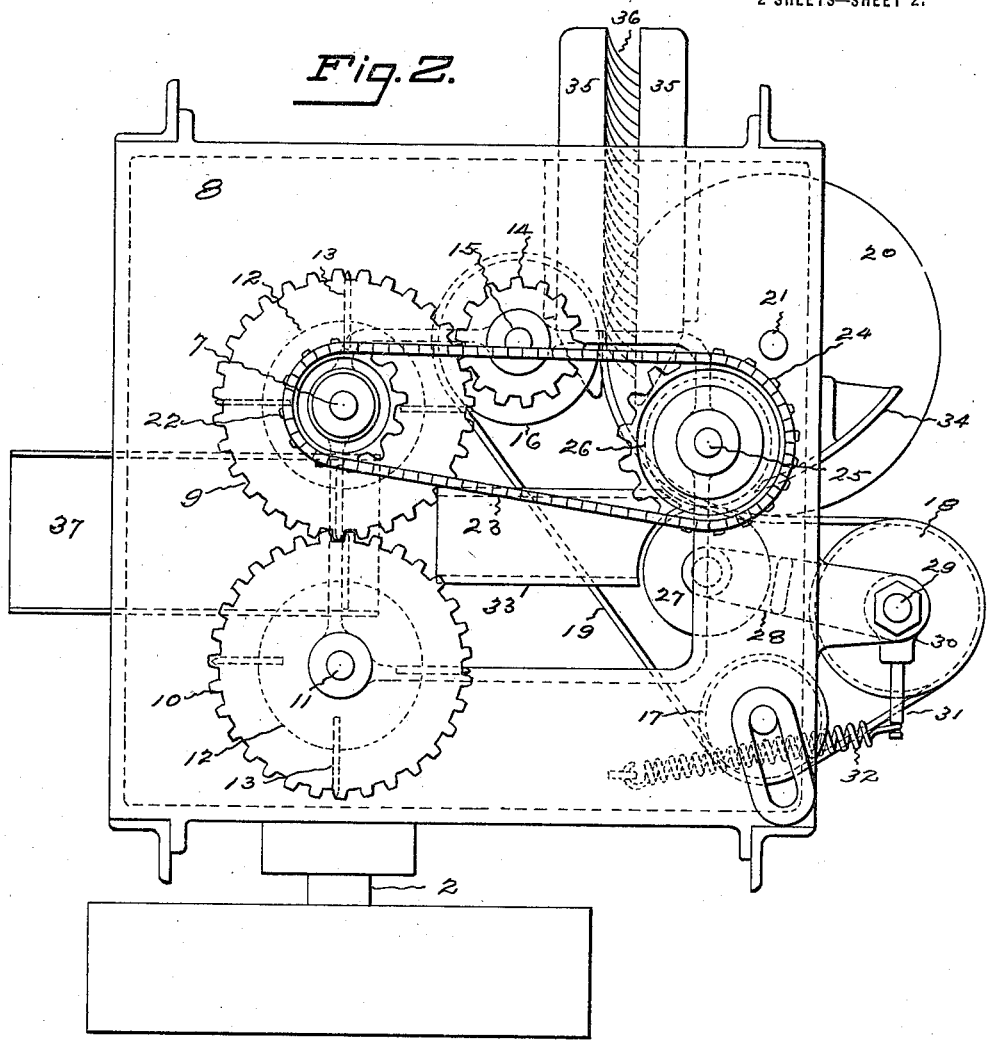
Figure 3:
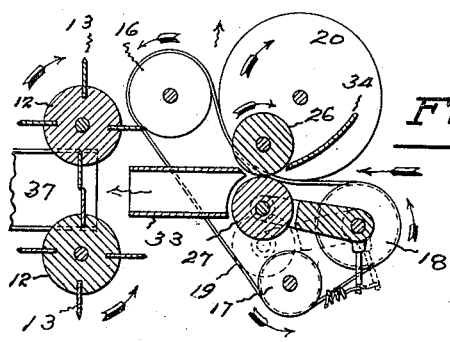

An embodiment of the invention is illustrated by the accompanying drawings in which Figure 1 shows a side elevation of the machine, Fig. 2 a plan, and Fig. 3, on smaller scale, a diagrammatic sectional view on the plane indicated by the dotted line 3—3 on Fig. 1.

This machine may be driven by any suitable source of power. It is illustrated as provided with a pulley 1 keyed to a horizontal shaft 2 supported in bearings in the uprights 3 mounted on cross beams 4 near the bottom of the frame. On this shaft is a bevel gear 5 that meshes with a bevel gear 6 on a vertical shaft 7, Fig. 1. Fastened to the vertical shaft above the top 8 of the frame is a gear 9 which meshes with a gear 10 on a vertical shaft 11, Fig. 2. On the shafts 7 and 11 which are thus geared together so as to rotate in unison, and below the top 8 of the frame are cylinders 12, projecting radially from which at intervals are knife blades 13. These parts are so set that when the machine is in operation the opposing knife blades coöperate to first grasp and pull along, then cut up and discharge whatever is passed between them, Fig. 3.

The gear 9 on the shaft 7 meshes with a pinion 14 on the upper end of a short vertical shaft 15. On this shaft below the top of the frame is a pulley 16 and passing around this pulley and the idler pulleys 17 and 18 is a belt 19. The belt also runs around a segment of the periphery of the roll 20 which is mounted below the top of the frame on an axle 21.

On the upper end of the vertical shaft 7 is a sprocket wheel 22. A chain 23 passes around this sprocket wheel and a sprocket wheel 24 on a short vertical shaft 25. On this shaft 25 below the top of the frame is a feed roll 26. In the same plane as this feed roll is a coöperating feed roll 27 that is mounted in bearings in the end of a swinging fork 28 that is pivoted on the stud 29 which forms the bearing for the idler pulley 18. Projecting from the hub 30 of the swinging fork is a pin 31 that is connected with the frame by a spring 32. The pull of this spring tends to throw the feed roll 27 against the feed roll 26. Between the feed rolls 26 and 27 and the shear blade cylinders 12 is a guiding tube 33. Attached to the frame on the entrance side of the feed rolls is a guide plate 34. Supported beneath the top of the frame and extending outward from where the belt 19 leaves the roll 20 is a throat consisting of two bars 35. A number of fine wire spring fingers 36 are fastened to the inside of one bar so their ends will press against the inside of the other bar. Below and extending beyond the cutters is an inclined discharge chute 37.

When this machine is used a stalk of tobacco with the leaves in proper condition is shaken so that the leaves will hang more or less vertically when the stalk is horizontal. The stalk with the leaves hanging in this way is thrust horizontally into the machine between the rotating feed rolls 26 and 27, the latter swinging away from the former according to the size of the stalk. As the stalk feeds between these rolls and into the guide tube 33 the hanging leaves are carried by the belt around between the belt and the periphery of the stripper roll 20 which runs in contact with the belt, in a direction that diverges from the travel of the stalk. This causes the leaves to be torn from the stalk. The stalk passes straight ahead through the tube and is caught by the revolving cutters and chopped into small pieces which drop into the discharge chute. The leaves which have been separated from the stalk are carried hanging down between the belt and the stripper roll and are delivered into the throat, that is, between the bars 35, and as the succeeding leaves are brought around those in advance are pushed along the throat past the free ends of the spring wire fingers 36 which, as stated, are fastened to one bar and simply press against the other bar in such manner that they yield and allow the leaves to move outward, but prevent the leaves from moving backward. When the throat has become filled with leaves or any desired number are gathered therein they are removed by the attendant for packing or further treatment. As a result of this construction leaves may be very rapidly removed from their stalks without being torn and bunched so that they can be easily gathered by an attendant while the stalks pass out and are chopped up into a suitable condition for use as fertilizer.

The invention claimed is:

1. A machine for stripping tobacco leaves from stalks and gathering the leaves in condition for packing, having driving mechanism, means for gripping the stalks and feeding the stalks longitudinally and horizontally at one level, means at a lower level than, and independent of, but operated coincidentally with said stalk-feeding means for gripping the stems of the leaves which are hanging down vertically from said stalks as the stalks are fed and carrying said vertically hanging leaves horizontally to one side in a divergent direction from the direction of feeding of the stalks and thus pulling the leaf stems from the stalks, and means for receiving and supporting the stems of the hanging leaves pulled from the stalks.

2. A machine for stripping tobacco leaves from stalks and gathering the leaves in condition for packing, having driving mechanism, means for gripping the stalks and feeding the stalks longitudinally and horizontally at one level, means at a lower level than, and independent of, but operated coincidentally with said stalk feeding means for gripping the stems of the leaves which are hanging down vertically from said stalks as the stalks are fed and carrying said vertically hanging leaves horizontally to one side in a divergent direction from the direction of the feeding of the stalks and thus pulling the leaf stems from the stalks, means for receiving and supporting the stems of the hanging leaves pulled from the stalks, and rotatable blades operated by said driving mechanism for drawing the stalks away from said leaf-carrying means and discharging the stalks from the machine in pieces.

3. A machine for stripping tobacco leaves from stalks, having means for gripping and feeding the stalks forward longitudinally in one direction, means below and independent of the stalk feeding means for catching leaves hanging by their stems from said stalks as the stalks are fed and carrying said leaves to one side in a divergent direction from the direction of the feed of the stalks and thus pulling them from the stalks, and a throat for receiving and holding vertically the leaves stripped from the stalks.

4. A machine for stripping tobacco leaves from stalks, having rotatable cutters for gripping and drawing the stalks forward longitudinally in one direction, means below said cutters for catching leaves hanging by their stems from said stalks as the stalks are fed and carrying said leaves to one side in a divergent direction from the direction of the fed stalks and thus pulling them from the stalks, and a throat for receiving and holding vertically leaves stripped from the stalks.

5. A machine for stripping tobacco leaves from stalks, having feed rolls for carrying the stalks forward longitudinally, means for rotating the feed rolls, and endless belt traveling in a plane below the feed rolls, means for driving the belt, and a stripper roll with a segment of its periphery engaging the belt for catching and carrying to one side the leaves hanging down from the stalks fed by the feed rolls, the entrance between the belt and the stripper roll that catches the leaves being below the entrance between the feed rolls that carry forward the stalks.

6. A machine for stripping tobacco leaves from stalks, having rotatory feed rolls for carrying the stalks forward longitudinally, a traveling endless belt below the plane of the feed rolls, a stripper roll with a segment of its periphery engaging the belt adjacent to the feed rolls for catching and carrying to one side the leaves hanging down from the stalks fed by the feed rolls, and a throat beyond the point where the belt and stripper roll separate for receiving the leaves and holding them vertically.

7. A machine for stripping tobacco leaves from stalks, having rotatory feed rolls carrying cutting blades for feeding stalks, an endless belt traveling in a plane below the feed rolls, a stripper roll in the plane of said belt with a segment of its periphery engaging the belt for catching and carrying to one side leaves hanging down from the stalks, and a throat beyond the point where the belt and stripper roll separate for receiving and holding vertically the leaves pulled from the stalks.

8. A machine for stripping tobacco leaves from stalks, having rotatory feed rolls for feeding stalks, a traveling endless belt below the feed rolls, a stripper roll with a segment of its periphery engaging the belt adjacent to the feed rolls for catching and carrying to one side leaves hanging by their stems from the fed stalks, revoluble knives on the delivery side of the feed rolls, a guide between the feed rolls and knives, a receiving throat beyond the point where the belt and stripper roll separate, outwardly yielding spring fingers in the throat, means for rotating the knives, and means intermediate the knives and feed rolls for rotating the feed rolls.

9. A machine for stripping tobacco leaves from stalks, comprising rotatory feed rolls for feeding stalks longitudinally, an endless belt traveling in a plane below the feed rolls, a stripper roll with a segment of its periphery engaging the belt for catching leaves hanging down from the fed stalks and carrying them to one side, revoluble knives on the delivery side of the feed rolls for drawing the stalks forward and cutting them up, and a throat beyond the point where the belt and stripper roll separate for receiving and holding vertically the leaves stripped from the stalks.

WILLIAM H. SEAVER.

Copies of this patent may be obtained for five cents each, by addressing the "Commissioner of Patents, Washington, D. C."